No. 856,027. PATENTED JUNE 4, 1907.
C. BUCKLAND.
AUXILIARY FELLY AND TIRE.
APPLICATION FILED NOV. 2, 1906.
Fig. 1,
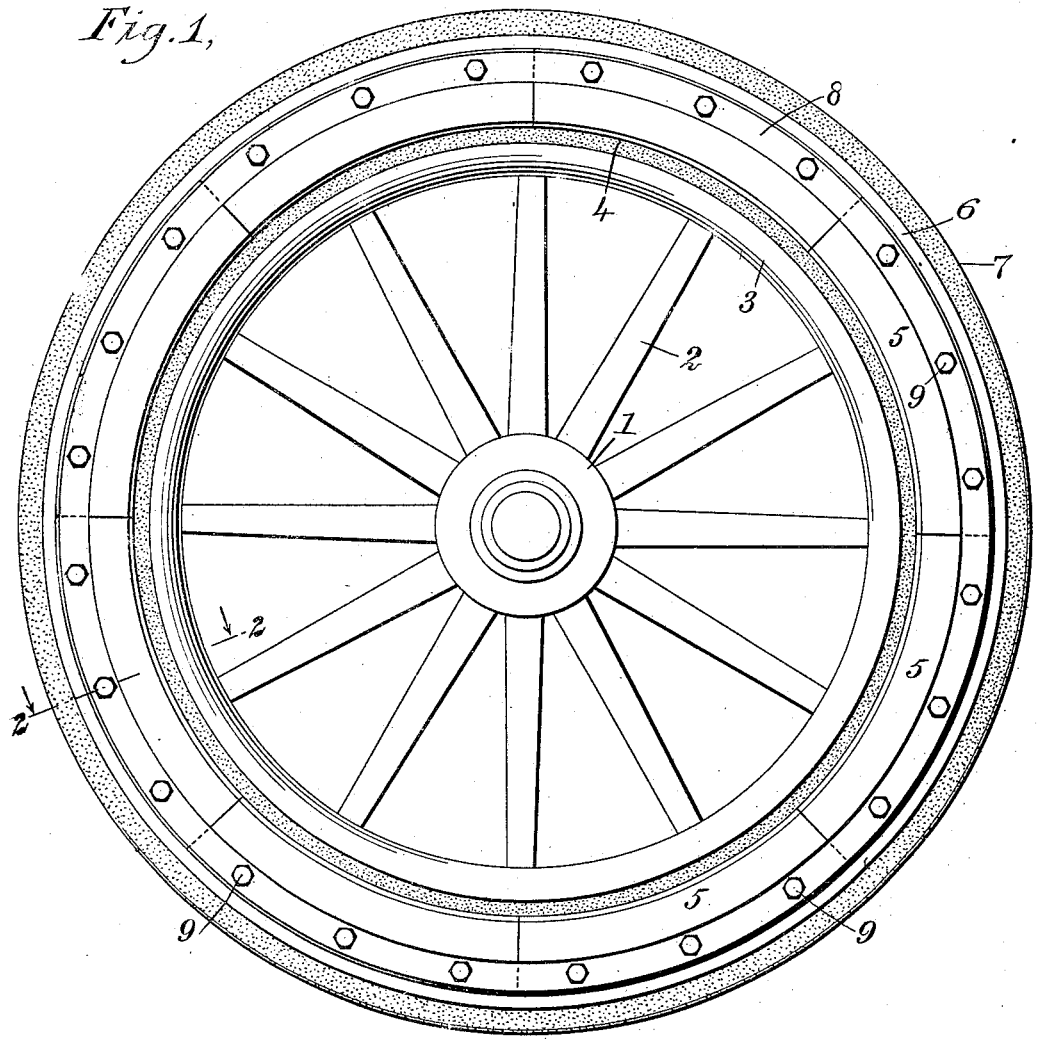
Fig. 2,
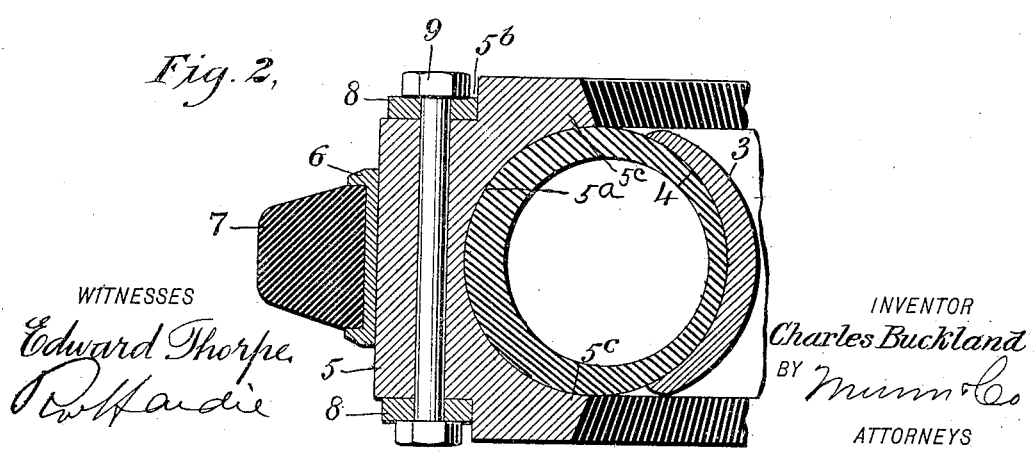
WITNESSES
Edward Thorpe
R W Hardie
INVENTOR
Charles Buckland
BY Munn & Co
ATTORNEYS

UNITED STATES PATENT OFFICE.

CHARLES BUCKLAND, OF HABANA, CUBA.

AUXILIARY FELLY AND TIRE.

No. 856,027.  Specification of Letters Patent.  Patented June 4, 1907.

Application filed November 2, 1906. Serial No. 341,717.

*To all whom it may concern:*

Be it known that I, CHARLES BUCKLAND, a citizen of the United States, and a resident of Habana, Cuba, have invented a new and Improved Auxiliary Felly and Tire, of which the following is a full, clear, and exact description.

This invention relates to vehicle wheels having inflated pneumatic tires, and has for its object to provide means simple in construction, effective in operation and durable in use, adapted to be readily attached to or removed from vehicle wheels of ordinary construction, and when applied thereto to protect the pneumatic tire from injury without interfering with the resiliency of the tire.

Reference is to be had to the accompanying drawings, in which drawings like characters of reference indicate like parts throughout the views, and in which Figure 1 is a side elevation of my invention applied to a vehicle wheel of ordinary construction; and Fig. 2 is a transverse section taken on the line 2—2 of Fig. 1.

As shown in the drawings, a hub 1 is connected by spokes 2 with a felly 3 having a pneumatic tube 4 mounted thereon, forming a vehicle wheel of ordinary construction. An auxiliary felly is mounted upon the tube 4 of said wheel, and is composed of segmental sections 5 having oppositely inclined ends and an inner surface 5$^a$ curved transversely, and adapted to bear against the outer half of the tube 4. The sides of the segmental sections 5 extend inward sufficiently to form annular flanges 5$^c$ adapted to extend to the central line of the tube 4, thereby protecting the tube from injury. The sections 5 preferably extend in width beyond the edges of the main felly 3 of the wheel, as shown in Fig. 2, and the periphery of the sections forming the auxiliary felly has straight transverse lines, with a rim 6 shrunk around the periphery of the auxiliary felly and adapted to receive and hold a solid tire 7 secured to said rim. The segmental sections 5 are provided with arc recesses 5$^b$ at the junction of the side and periphery of said sections, adapted to receive clamping rings 8 which are secured in place in said recesses by means of bolts 9 extending transversely through said rings and sections. The segmental sections after being assembled are turned in a lathe or other similar device so as to make the entire felly perfectly true in outline. The sections composing the auxiliary felly are connected with the clamping rings 8 independently of each other, so that one or more of said sections if injured may be removed and renewed without disturbing the other sections composing the auxiliary felly.

When constructed in the manner shown and described the main wheel of the vehicle may be used with or without the auxiliary felly and tire, as desired. The auxiliary felly is applied to the tire of the main wheel by allowing the air to escape from the tire, and thereby allowing the tire to collapse. After the auxiliary felly has been placed in position the tire is again inflated until the outer half of the tire binds firmly against the inner wall of the segmental sections composing the auxiliary tire, to such an extent as to prevent the auxiliary felly from slipping on said tire or moving laterally therefrom. To this end the inner diameter of the auxiliary tire is made slightly smaller than the outer diameter of the pneumatic tire when expanded to its full extent.

Having thus described my invention, what I claim as new and desire to secure by Letters Patent is:

1. A vehicle wheel having a pneumatic tire mounted upon a felly, an auxiliary felly composed of segmental sections curved transversely on their inner sides to receive the outer portion of said tire, and provided on their outer sides with arc recesses, clamping rings secured in said recesses by means of transverse bolts; a rim shrunk on the periphery of said sections, and a solid tire narrower than said segmental sections secured to said rim, substantially as shown and described.

2. An auxiliary felly composed of segmental sections curved transversely on their inner sides, and provided on their outer sides with arc recesses, clamping rings secured in said recesses by means of transverse bolts, a rim shrunk on the periphery of said sections, and a solid tire narrower than said segmental sections secured to said rim, substantially as shown and described.

3. A vehicle wheel having a pneumatic tire mounted upon a felly, an auxiliary felly composed of segmental sections curved transversely on their inner surface, and provided with flanges adapted to bear against the opposite sides of the pneumatic tire, clamping rings secured to the sides of said sections, and connected together by means of transverse bolts, a rim narrower than said sections shrunk onto the periphery thereof, and a solid tire secured to said rim, substantially as shown and described.

4. An auxiliary felly comprising a series of segmental sections curved longitudinally and transversely on their inner surface, provided with lateral flanges adapted to bear against the sides of a pneumatic tire, and with arc recesses, clamping rings secured in said recesses by means of transverse bolts, a rim shrunk on the periphery of said sections, and a solid tire narrower than said segmental sections secured to said rim, substantially as shown and described.

In testimony whereof I have signed my name to this specification in the presence of two subscribing witnesses.

CHARLES BUCKLAND.

Witnesses:
VICTOR NORMAND,
A. ROGERS.